US012342154B2

(12) United States Patent
Messingher Lang et al.

(10) Patent No.: US 12,342,154 B2
(45) Date of Patent: Jun. 24, 2025

(54) AUDIO CAPTURE WITH MULTIPLE DEVICES

(71) Applicant: Apple Inc., Cupertino, CA (US)

(72) Inventors: Shai Messingher Lang, Santa Clara, CA (US); Jonathan D. Sheaffer, San Jose, CA (US); Symeon Delikaris Manias, Playa Vista, CA (US)

(73) Assignee: APPLE INC., Cupertino, CA (US)

( * ) Notice: Subject to any disclaimer, the term of this patent is extended or adjusted under 35 U.S.C. 154(b) by 266 days.

(21) Appl. No.: 18/212,488

(22) Filed: Jun. 21, 2023

(65) Prior Publication Data

US 2024/0007816 A1 Jan. 4, 2024

Related U.S. Application Data

(60) Provisional application No. 63/356,624, filed on Jun. 29, 2022.

(51) Int. Cl.
*H04S 7/00* (2006.01)

(52) U.S. Cl.
CPC .................................. *H04S 7/302* (2013.01)

(58) Field of Classification Search
None
See application file for complete search history.

(56) References Cited

U.S. PATENT DOCUMENTS 10,038,957 B2 * 7/2018 Laaksonen ............... H04R 5/02
10,165,388 B1 12/2018 Diverdi et al.
10,820,097 B2 * 10/2020 Tsingos .................. H04R 3/005
10,911,885 B1 2/2021 Chemistruck et al.
(Continued)

*Primary Examiner* — Paul W Huber
(74) *Attorney, Agent, or Firm* — Fernando & Partners, LLP

(57) ABSTRACT

In one implementation, a method of visualizing a combined audio pick-up pattern is performed at a first device in a physical environment, the first device including a display, one or more processors, and non-transitory memory. The method includes determining a first audio pick-up pattern of the first device. The method includes determining one or more second audio pick-up patterns of a respective one or more second devices. The method includes determining a combined audio pick-up pattern of the first device and the one or more second devices based on the first audio pick-up pattern and the one or more second audio pick-up patterns. The method includes displaying, on the display, a representation of the combined audio pick-up pattern.

In one implementation, a method of determining an audio emission pattern is performed at a first device at a first location, the first device having a microphone, one or more processors, and non-transitory memory. The method includes obtaining, via the microphone, first audio of a sound source. The method includes receiving, from one or more second devices, one or more second audio of the sound source. The method includes determining one or more second locations of the one or more second devices. The method includes determining an audio emission pattern of the sound source based on the first audio data, the one or more second audio data, and the one or more second locations, wherein the audio emission pattern of the sound source indicates a sound level at various locations relative to the sound source.

20 Claims, 8 Drawing Sheets

(56) References Cited

U.S. PATENT DOCUMENTS

| | | | | |
|---|---|---|---|---|
| 11,736,882 | B2 * | 8/2023 | Guérin | H04S 7/301<br>381/58 |
| 2016/0021477 | A1 | 1/2016 | Hiipakka et al. | |
| 2018/0338106 | A1 | 11/2018 | Arrasvuori et al. | |
| 2019/0139312 | A1 * | 5/2019 | Leppänen | G06F 3/0486 |
| 2021/0352255 | A1 * | 11/2021 | Nepveu | H04N 13/156 |

* cited by examiner

AUDIO CAPTURE WITH MULTIPLE DEVICES

CROSS-REFERENCE TO RELATED APPLICATIONS

This application claims priority to U.S. Provisional Patent No. 63/356,624, filed on Jun. 29, 2022, which is hereby incorporated by reference in its entirety.

TECHNICAL FIELD

The present disclosure generally relates to determining an audio emission pattern of a physical sound source using multiple devices.

BACKGROUND

A virtual object in an extended reality (XR) environment may be an audio emitter object that emits sound in an XR environment with a volume that depends on the relative location and/or orientation of the virtual object and the user in the XR environment according to an audio emission pattern.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
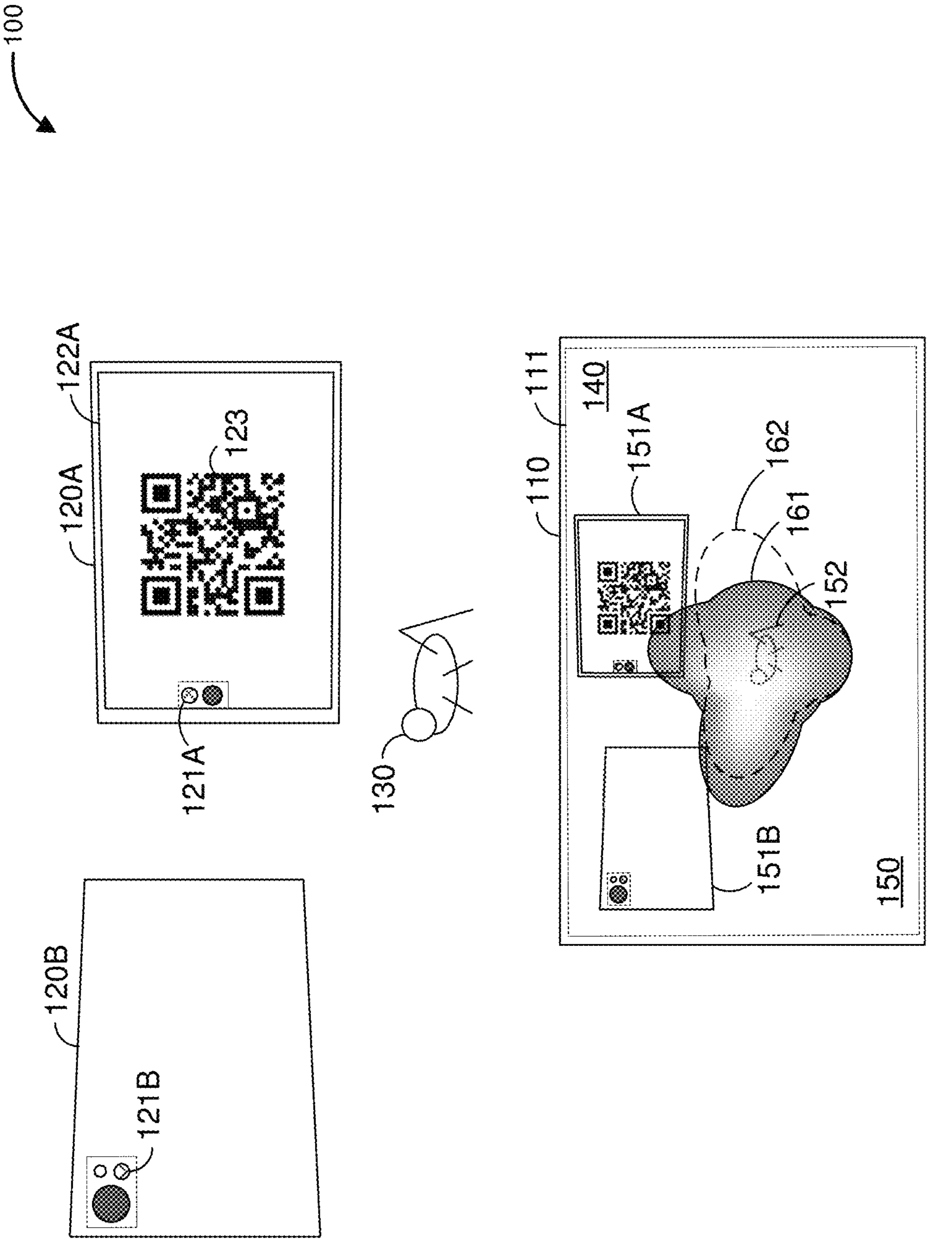
FIGS. 1A-1C illustrate a first physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for visualizing a combined audio pick-up pattern. In various implementations, the method is performed at a first device in a physical environment, the first device having a display, one or more processors, and non-transitory memory. The method includes determining a first audio pick-up pattern of the first device. The method includes determining one or more second audio pick-up patterns of a respective one or more second devices. The method includes determining a combined audio pick-up pattern of the first device and the one or more second devices based on the first audio pick-up pattern and the one or more second audio pick-up patterns. The method includes displaying, on the display, a representation of the combined audio pick-up pattern.

Various implementations disclosed herein include devices, systems, and methods for determining an audio emission pattern. In various implementations, the method is performed at a first device at a first location, the first device having a microphone, one or more processors, and non-transitory memory. The method includes obtaining, via the microphone, first audio of a sound source. The method includes receiving, from one or more second devices, one or more second audio of the sound source. The method includes determining one or more second locations of the one or more second devices. The method includes determining an audio emission pattern of the sound source based on the first audio data, the one or more second audio data, and the one or more second locations, wherein the audio emission pattern of the sound source indicates a sound level at various locations relative to the sound source.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, a virtual object in an extended reality (XR) environment may be an audio emitter object that emits sound in an XR environment with a volume that depends on the relative location and/or orientation of the virtual object and the user in the XR environment according to an audio emission pattern.

In various implementations, it may be beneficial for a virtual object to have an audio emission pattern substantially similar to a physical version of the virtual object. Determining the audio emission pattern of a physical object can be difficult and/or require highly controlled conditions. Accordingly, in various implementations described herein, the audio emission pattern of a physical object is determined using multiple electronic devices, such as smartphones, tablets, and/or head-mounted devices.

FIG. 1A illustrates a first physical environment 100 at a first time. The first physical environment 100 is associated with a three-dimensional environment coordinate system in which each point in the environment coordinate system is associated with an x-coordinate, a y-coordinate, and a z-coordinate. The first physical environment 100 includes a primary electronic device 110 including a primary display 111. On an opposite side of the primary display 111, the primary electronic device 110 includes a primary camera (not shown) having a primary camera pose (e.g., location and orientation) in the environment coordinate system. On the opposite side of the primary display 111, the primary electronic device 110 includes a primary microphone (not shown) at a primary microphone pose in the environment coordinate system. The primary microphone has a primary audio pick-up pattern.

The audio pick-up pattern for a microphone indicates the directionality of the microphone. For example, in various implementations, a polar audio pick-up pattern for a microphone indicates, at each angle, the ratio of the volume of sound recorded by the microphone to the volume of a sound source at that angle. As another example, in various implementations, a local Cartesian audio pick-up pattern for a microphone indicates, at each point in a microphone coordinate system having an origin at the location of the microphone, the ratio of the volume of sound recorded by the microphone to the volume of a sound source at that point. In various implementations, the local Cartesian audio pick-up pattern can be determined from the polar audio pick-up pattern using an inverse-square law. As another example, a global Cartesian audio pick-up pattern for a microphone indicates, at each point in the environment coordinate system, the ratio of the volume of sound recorded by the microphone to the volume of a sound source at that point. In various implementations, the global Cartesian audio pick-up pattern can be determined from the local Cartesian audio pick-up pattern using a transform based on the pose of the microphone in the environment coordinate system.

The first physical environment 100 includes a first secondary electronic device 120A. The first secondary electronic device 120A includes a first secondary microphone 121A at a first secondary microphone pose in the environment coordinate system. The first secondary microphone 121A has a first secondary audio pick-up pattern. The first secondary electronic device 120A includes a first secondary display 122A displaying a QR code 123. The first physical environment 100 includes a second secondary electronic device 120B. The second secondary electronic device 120A includes a second secondary microphone 121A at a second secondary microphone pose in the environment coordinate system. The second secondary electronic device 120A has a second secondary audio pick-up pattern.

The first physical environment 100 includes a cricket 130, a physical sound source.

The primary display 111 displays a first XR environment 140. The first XR environment 140 includes a physical environment representation 150 of a portion of the first physical environment 100 augmented with a virtual pick-up representation 161. In various implementations, the physical environment representation 150 is generated based on an image of the first physical environment 100 captured with the primary camera of the primary electronic device 110 having a field-of-view directed toward the first physical environment 100. Accordingly, the physical environment representation 150 includes a first secondary electronic device representation 151A of the first secondary electronic device 120A, a second secondary electronic device representation 151B of the second secondary electronic device 120B, and a cricket representation 152 of the cricket 130.

The XR environment 140 includes a virtual pick-up representation 161. To display the virtual pick-up representation 161, the primary electronic device 110 determines one or more sets of three-dimensional coordinates in the environment coordinate system of the virtual pick-up representation 161. The primary electronic device 110 determines one or more locations on the primary display 111 (e.g., one or more sets of two-dimensional coordinates in a display coordinate system) corresponding to the one or more sets of three-dimensional coordinates in the environment coordinate system using a transform based on the primary camera pose (e.g., extrinsic parameters of the primary camera and, in various implementations, intrinsic parameters of the primary camera, such as the focal length, field-of-view, resolution, etc.). Then, the primary electronic device 110 displays the virtual pick-up representation at the locations on the primary display 111.

The primary electronic device 110 determines the one or more sets of three-dimensional coordinates in the environment coordinate space for the virtual pick-up representation 161 based on the poses of the microphones (e.g., the primary microphone pose, the first secondary microphone pose, and the second secondary microphone pose) and their audio pick-up patterns (e.g., the primary audio pick-up pattern, the first secondary audio pick-up pattern, and the second secondary audio pick-up pattern).

The sound of a sound source recorded by multiple microphones can be combined using appropriate synchronization and processing to generate a combined sound. A combined audio pick-up pattern for multiple microphones can be defined as, at each point in the environment coordinate system, the ratio of the volume of the combined sound to the volume of the sound source. In various implementations, the combined audio pick-up pattern can be determined by combining (e.g., adding) the global Cartesian audio pick-up patterns of each of the multiple microphones.

Accordingly, in various implementations, the primary electronic device 110 determines the combined audio pick-up pattern for the primary microphone, the first secondary microphone 121A, and the second secondary microphone 121B based on the poses of the microphones and their audio pick-up patterns. In various implementations, the primary electronic device 110 determines the primary microphone pose using an inertial measurement unit (IMU) of the primary electronic device 110. In various implementations, the primary electronic device 110 determines the secondary microphone poses by detecting the secondary electronic devices 120A-120B in the image of the physical environment 100. In various implementations, the primary electronic device 110 determines the secondary microphone poses by receiving pose data from the secondary electronic devices 120A-120B (which may be based on IMUs of the secondary electronic devices 120A-120B). In various implementations, the primary electronic device 110 determines the secondary microphone poses by reading machine-readable code displayed by the secondary electronic devices 120A-120B, such as the QR code 123 displayed by the first secondary electronic device 120A.

In various implementations, the primary electronic device 110 determines the primary audio pick-up pattern by reading data from a memory of the primary electronic device 110. In various implementations, the primary electronic device 110 determines the secondary audio pick-up patterns by detecting the secondary electronic devices 120A-120B in the image of the physical environment 100, classifying each of the secondary electronic devices 120A-120B as a device type, and obtaining data from a memory of the primary electronic device 110 or a remote database associating device types with audio pick-up patterns. In various implementations, the primary electronic device 110 determines the secondary audio pick-up patterns by receiving data from the secondary electronic devices 120A-120B. In various implementations, the primary electronic device 110 determines the secondary audio pick-up patterns by reading machine-readable code displayed by the secondary electronic devices 120A-120B, such as the QR code 123 displayed by the first secondary electronic device 120A.

In various implementations, the primary electronic device 110 determines one or more sets of coordinates in the environment coordinate system for the virtual pick-up representation 161 at which the combined audio pick-up pattern is a threshold value. In various implementations, the primary electronic device 110 determines one or more sets of coordinates in the environment coordinate system for the virtual pick-up representation 161 at which the combined audio pick-up pattern is greater than or equal to a threshold value.

In various implementations, the threshold value is a default value. In various implementations, the threshold value is based on the number of microphones. In various implementations, the threshold value is based on the device types of the primary electronic device 110 and the secondary electronic devices 120A-120B. In various implementations, the threshold value is based on user input, e.g., setting or changing the threshold value.

In various implementations, the audio pick-up patterns (and, resultantly, the combined audio pick-up pattern) are frequency-dependent. Accordingly, in various implementations, the primary electronic device 110 determines one or more sets of coordinates in the environment coordinate system for the virtual pick-up representation 161 at which the combined audio pick-up pattern at a particular frequency (or averaged over a plurality or range of frequencies) is a threshold value (or greater than or equal to the threshold value).

In various implementations, the particular frequency is a default frequency. In various implementations, the default frequency is based on user input, e.g., setting or changing the default frequency.

As described above, the primary electronic device 110 transforms the one or more sets of coordinates into the environment coordinate system into locations on the primary display 111 using a transform based on the primary camera pose and displays the virtual pick-up representation 161 at those location on the primary display 111.

In various implementations, the primary device 110 provides feedback regarding a target combined audio pick-up pattern. The target combined audio pick-up pattern may be based on the number and/or device types of the primary device and/or secondary devices. In various implementations, the primary device 110 provides haptic feedback at the primary device 110 in proportion (or inverse proportion) to a distance from a location at which the target combined pick-up pattern is achieved. In various implementations, the primary device 110 display, in the primary display 111, a target representation 162 of the target combined audio pick-up pattern.

Figure 1B:
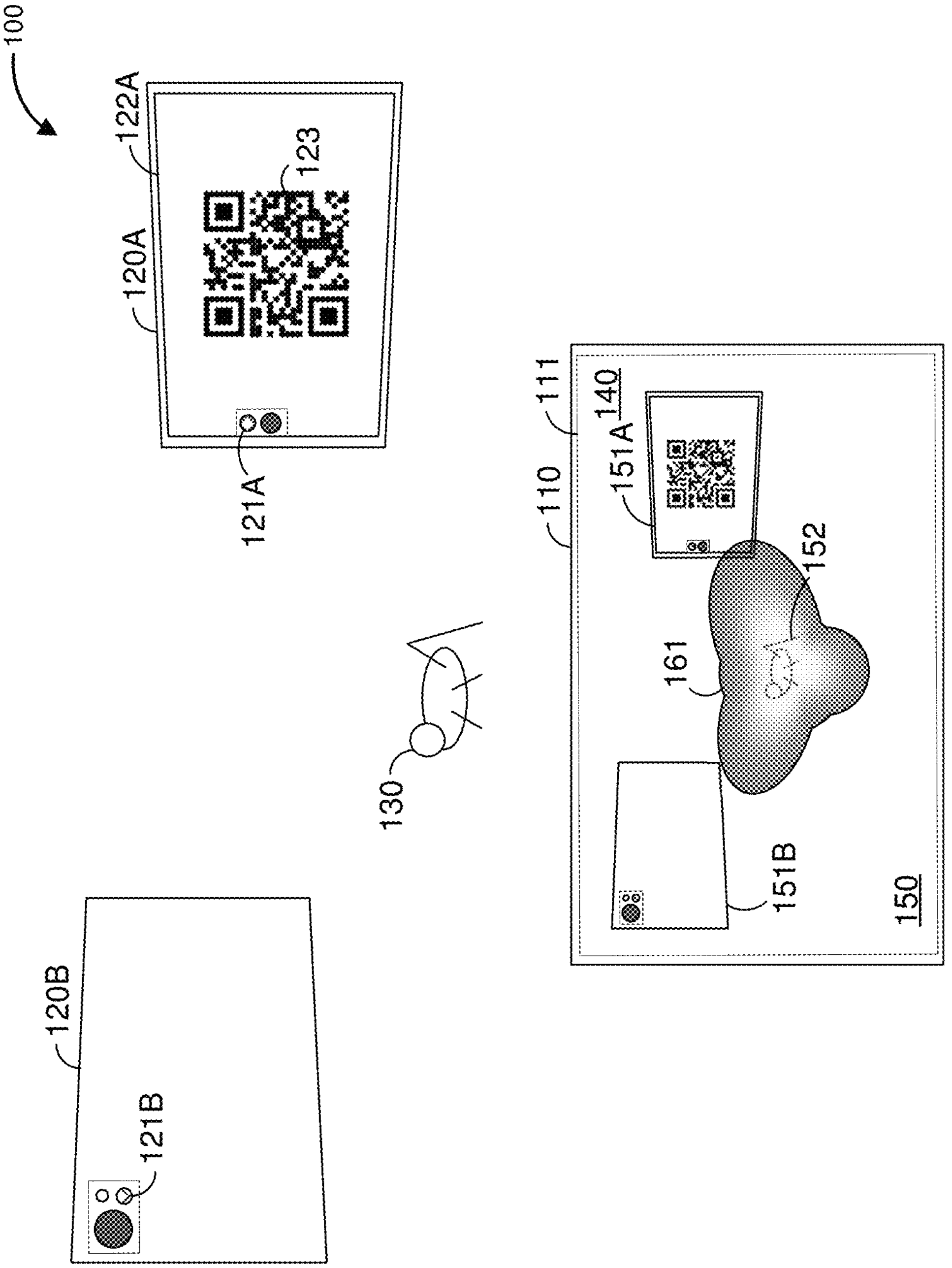

FIG. 1B illustrates a first physical environment 100 at a second time subsequent to the first time. At the second time, the first secondary electronic device 120A has moved, moving the first secondary microphone 121A from the first secondary microphone pose to an updated first secondary microphone pose. In response to movement of the first secondary electronic device 120A, the first secondary electronic device representation 151A has moved in the first XR environment 140 displayed on the primary display 111 of the primary electronic device 110. Further, in response to the change in microphone pose from the first secondary microphone pose to the updated first secondary microphone pose, the combined audio pick-up pattern and corresponding virtual pick-up pattern representation 161 has changed in the first XR environment 140 displayed on the primary display 111 of the primary electronic device 110.

Figure 1C:
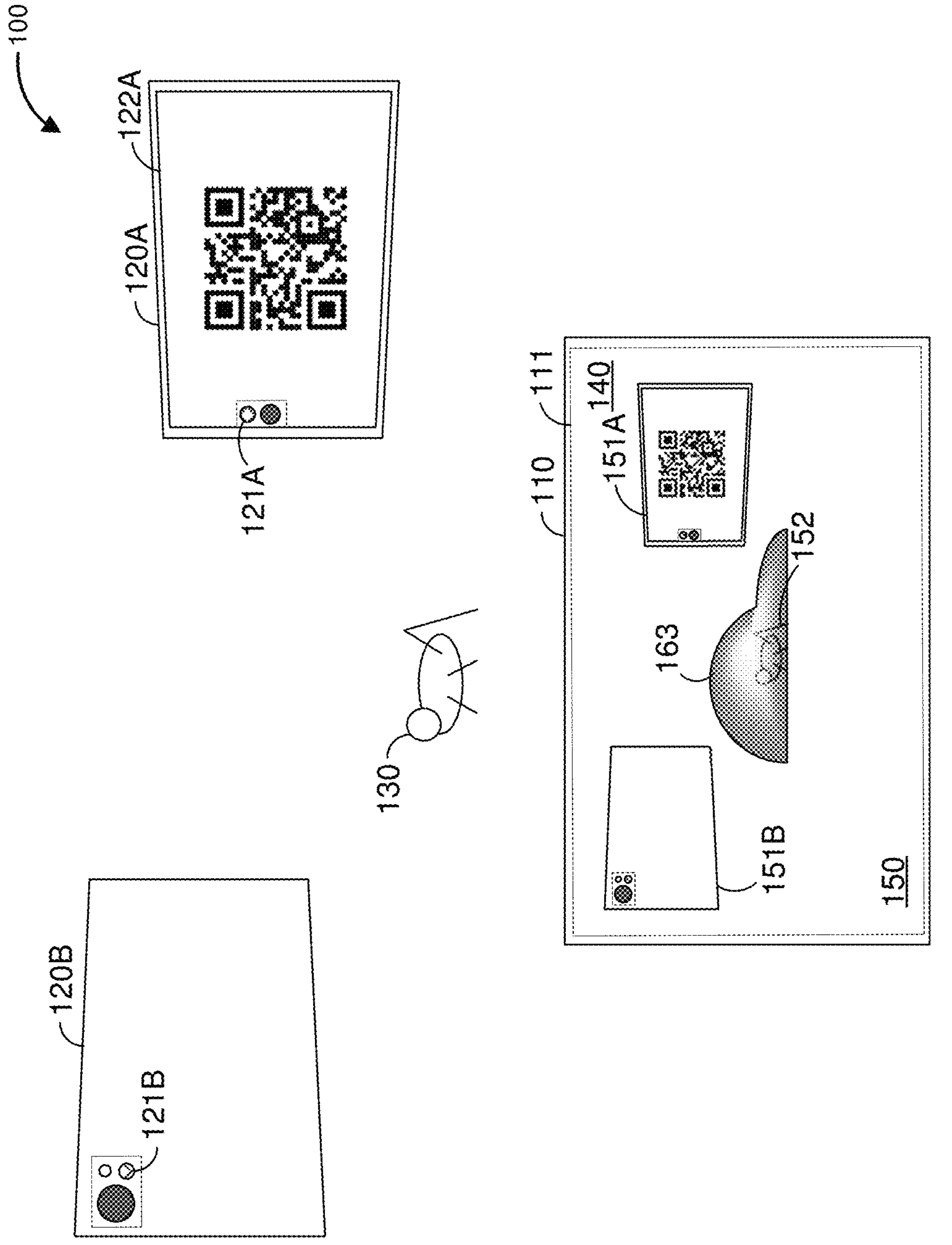

FIG. 1C illustrates the first physical environment 100 at a third time subsequent to the second time. At the first time, the second time, and additional times, the primary electronic device 110 and the secondary electronic devices 120A-120B record sound emitted by the cricket 130.

At each of the times and each of a plurality of frequencies, a base volume of sound emitted by the cricket 130 can be determined based on the volume of the combined sound at the time and frequency. In various implementations, a true volume of sound emitted by the cricket 130 can be determined based on the base volume of sound emitted by the cricket 130 and the combined audio pick-up pattern at the location of the cricket 130.

For each of the microphones, times, and frequencies, the directional volume of sound emitted by the cricket 130 at the time and frequency in the direction of the microphone can be determined based on the volume of sound recorded by the microphone at the time, the pose of the microphone, and the audio pick-up pattern of the microphone.

In various implementations, the directional volume of sound at each time and frequency is normalized by dividing by the base volume of sound at the time and frequency. In various implementations, values for the normalized directional volume of sound are combined to determine a time-varying, frequency-dependent audio emission pattern for the cricket 130. In various implementations, the time-varying, frequency-dependent audio emission pattern is averaged over time and/or frequency.

In FIG. 1C, the virtual pick-up representation 161 is replaced with a virtual emission representation 163 of the audio emission pattern.

Figure 2A:
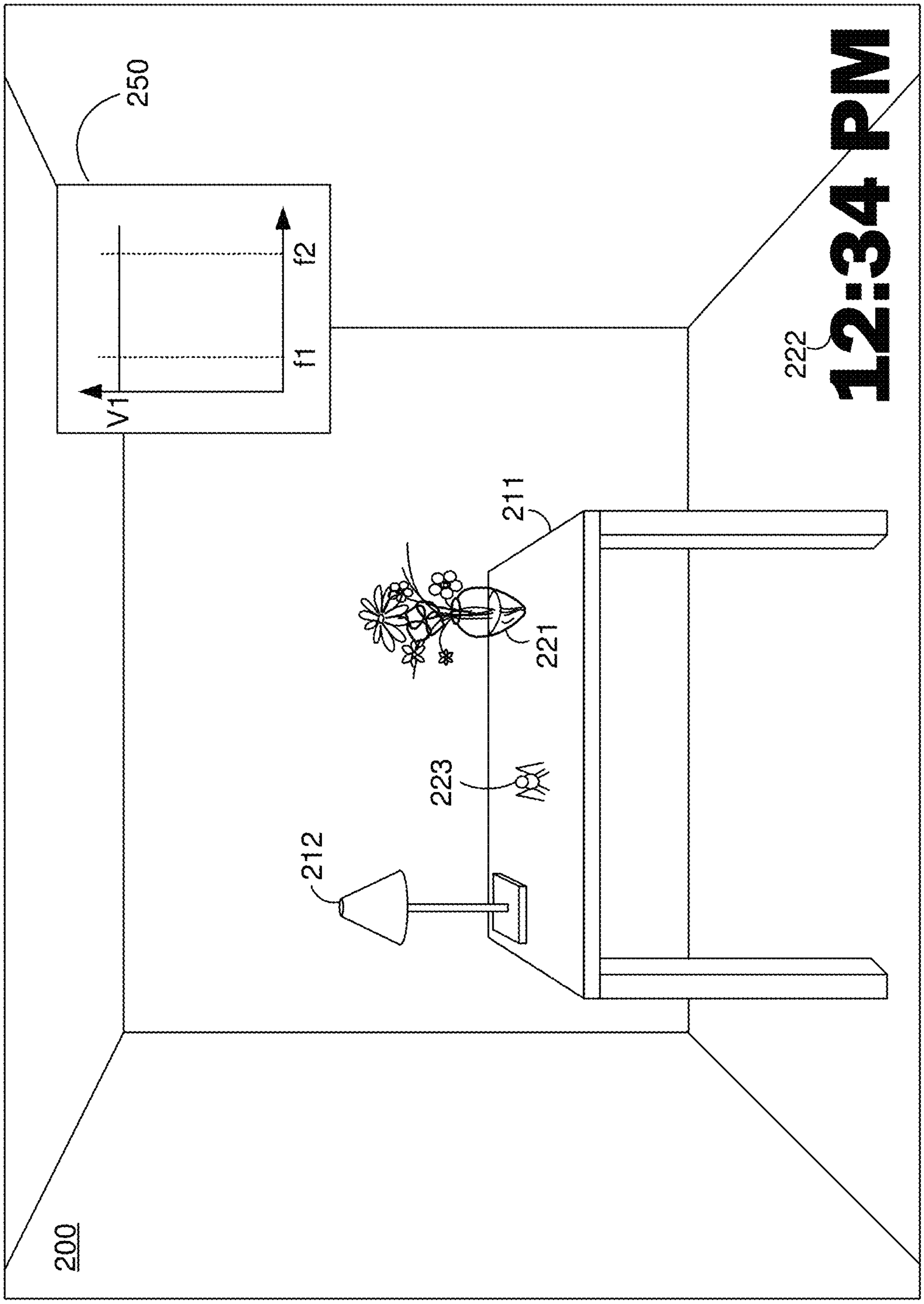
FIGS. 2A-2B illustrate a second XR environment.

FIG. 2A illustrates a second XR environment 200 based on a second physical environment at a first time from a user perspective. The second XR environment 200 includes a table representation 211 of a physical table in the second physical environment and a lamp representation 212 of a physical lamp in the second physical environment. The second XR environment 200 includes virtual flowers 221 as a world-locked virtual object on the table representation 211. The second XR environment 200 includes a virtual clock 222 as a display-locked virtual object. The second XR environment 200 includes a virtual cricket 223 as a world-locked virtual object on the table representation 211.

The virtual cricket 223 is an audio emitter object associated with an audio emission pattern. In various implementations, the audio emission pattern of the virtual cricket 223 is based on the audio emission pattern of the cricket 130 determined in the first physical environment 100. Accordingly, in various implementations, the audio emission pattern of the virtual cricket 223 is time-varying and/or frequency-dependent. In various implementations, the sound produced by the virtual cricket 223 is based on the combined sound determined in the first physical environment 100. In various implementations, the sound produced by the virtual cricket 223 is a different sound, but still is based on the audio emission pattern of the cricket 130. For example, the audio emission pattern of a physical trumpet playing a first melody in a physical environment can be used to render a virtual trumpet playing a second melody in an XR environment. As another example, the audio emission pattern of a physical person speaking a first set of words can be used to render a virtual person speaking a second set of words.

The second XR environment 200 includes a volume meter 250 indicating the volume of audio played at the user location at various frequencies. In particular, at the first time, the volume at a first frequency, f1, is a first volume, V1, and the volume at a second frequency, f2, is a second volume, V2. In various implementations, the volume meter 250 is not displayed. However, for ease of explanation, the volume meter 250 is illustrated in FIGS. 2A and 2B.

Figure 2B:
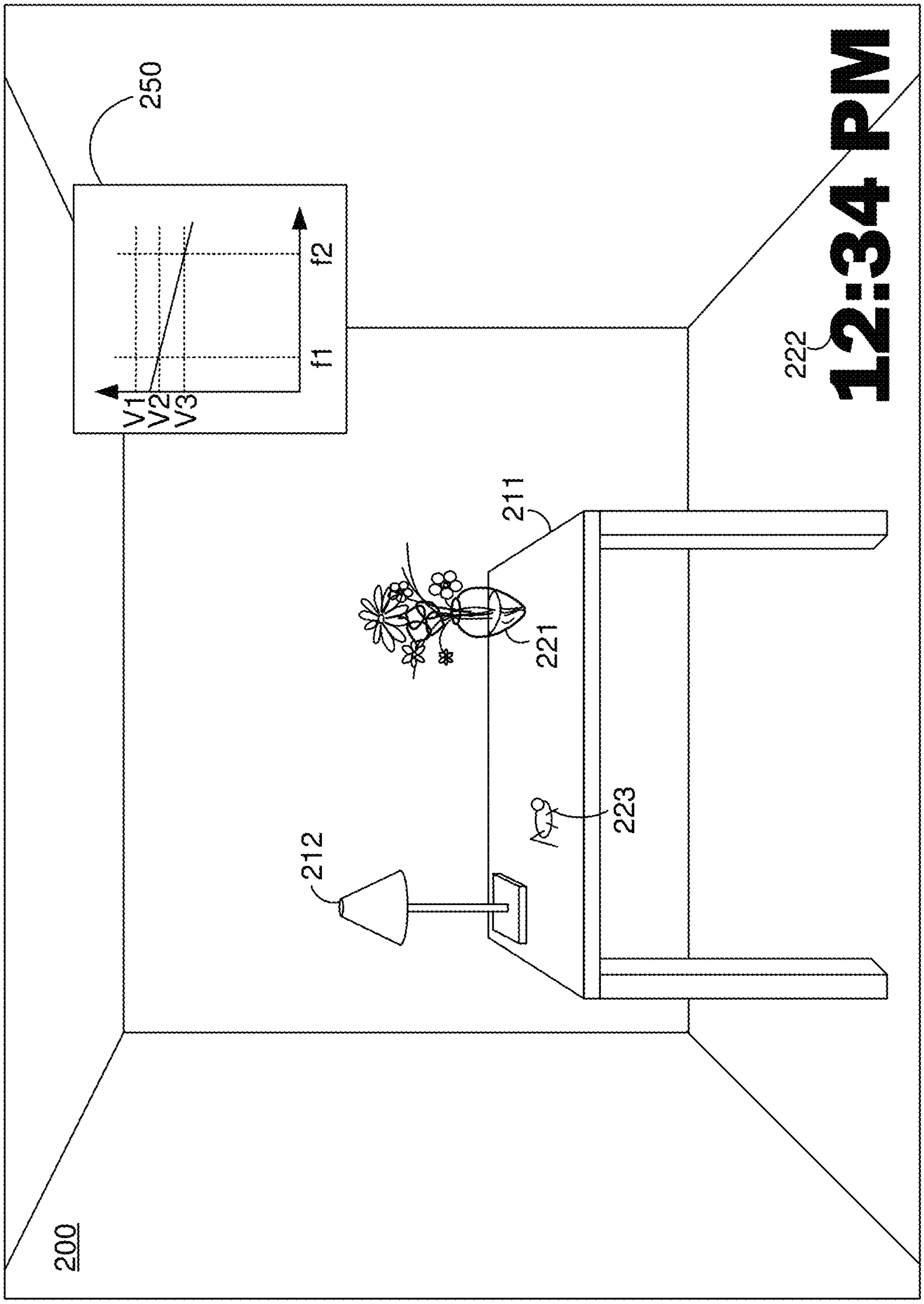

FIG. 2B illustrates the second XR environment 200 at a second time from a user perspective. In FIG. 2B, the virtual cricket 223 has changed pose. Because the virtual cricket 223 has changed pose, the volume of audio played at the user location at the second time is less than the volume of audio played at the user location at the first time. Thus, the sound is quieter or less intense. Further, the change in volume is frequency-dependent such that the change in volume is greater at higher frequencies than at lower frequencies. Accordingly, the second XR environment 200 includes the volume meter 250 indicating the volume of audio played at the second user location at the first frequency, f1, is a second volume, V2, less than the first volume, V1, and the volume of audio played at the second user location at the second frequency, f2, is a third volume, V3, less than the first volume, V1, and also less than the second volume, V2. Thus, the difference between the first volume, V1, and the second volume, V2, is less than the difference between the first volume, V2, and the third volume, V3.

Figure 3:
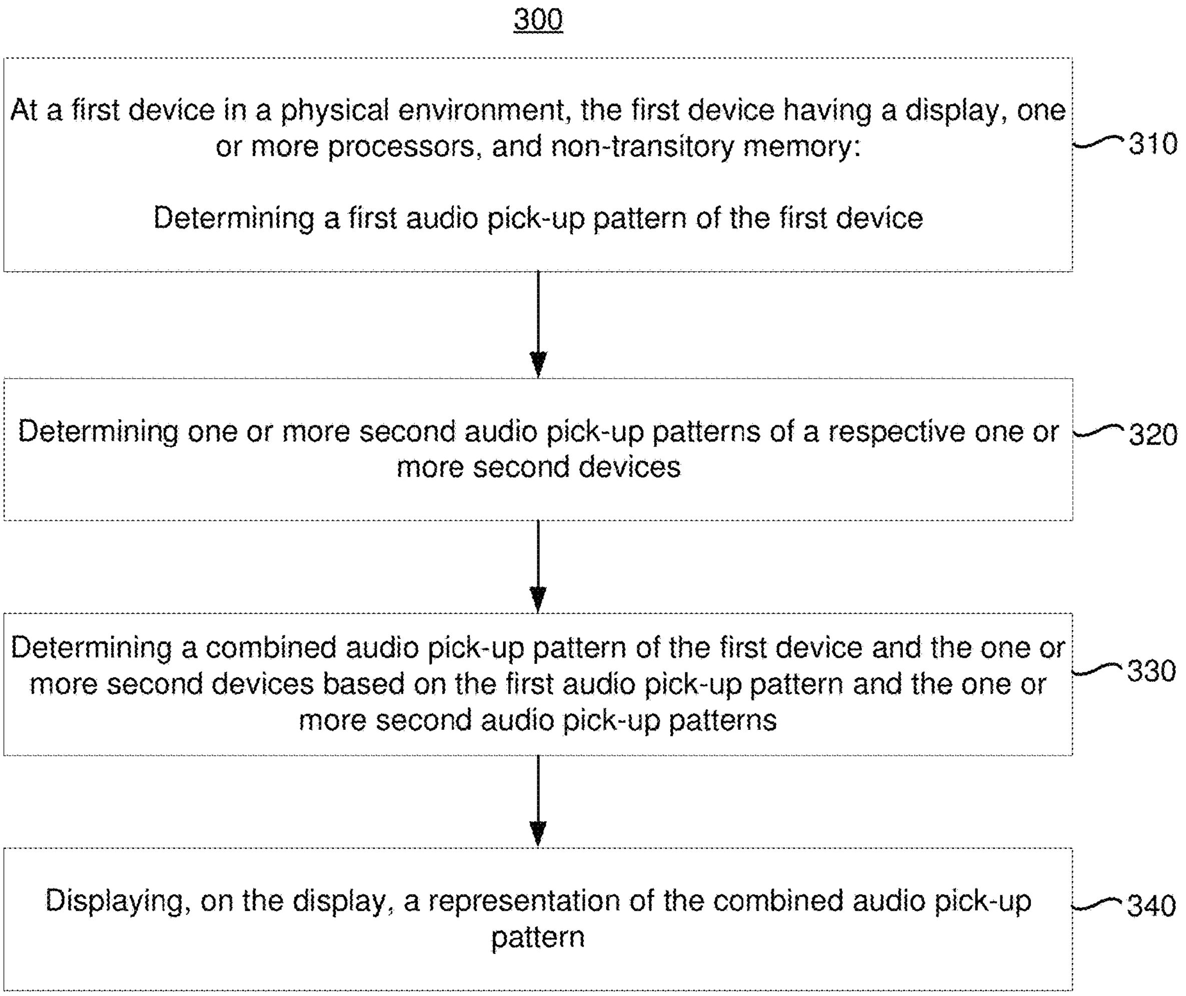
FIG. 3 is a flowchart representation of a method of visualizing a combined audio pick-up pattern in accordance with some implementations.

FIG. 3 is a flowchart representation of a method 300 of visualizing a combined audio pick-up pattern in accordance with some implementations. In various implementations, the method 300 is performed by a first device in a physical environment, the first device having a display, one or more processors, and non-transitory memory. In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device determining a first audio pick-up pattern of the first device. In various implementations, the device determines the first audio pick-up pattern by reading data from non-transitory memory indicative of the first audio pick-up pattern of the first device.

The method 300 continues, in block 320, with the device determining one or more second audio pick-up patterns of a respective one or more second devices. In various implementations, the first device determines the second audio pick-up patterns by detecting the second devices in an image of the physical environment, classifying each of the second devices as a device type, and reading data from non-transitory memory (local or remote) associating device types with audio pick-up patterns. Thus, in various implementations, determining a particular audio pick-up pattern of a particular second device includes determining a device type of the particular second device. In various implementations, the first device determines the second audio pick-up patterns by receiving data from the second electronic devices. In various implementations, the first device determines the second audio pick-up patterns by reading machine-readable code displayed by the second electronic devices.

The method 300 continues, in block 330, with the device determining a combined audio pick-up pattern of the first device and the one or more second devices based on the first audio pick-up pattern and the one or more second audio pick-up patterns.

In various implementations, determining the combined audio pick-up pattern includes converting at least one of the first audio pick-up pattern and the one or more second audio pick-up patterns into a global Cartesian audio pick-up pattern. Accordingly, in various implementations, determining at least one of the first audio pick-up pattern or the one or more second audio pick-up patterns includes converting a polar audio pick-up pattern into a local Cartesian audio pick-up pattern based on an inverse-square law. Further, in various implementations, determining at least one of the first audio pick-up pattern or the one or more second audio pick-up patterns includes converting a local Cartesian audio pick-up pattern into a global Cartesian audio pick-up pattern based on a location and/or orientation of the associated device. Thus, in various implementations, determining a particular audio pick-up pattern of a particular device includes determining a location and/or orientation of the particular device in the physical environment. In various implementations, the particular device is the first device. In various implementations, the first device determines the location and/or orientation of the first device using an IMU of the first device.

In various implementations, the particular device is a particular second device. In various implementations, the first device determines the location and/or orientation of the particular second device by detecting the particular second device in the image of the physical environment. In various implementations, the first device determines the location and/or orientation of the particular second device by receiving pose data from the particular second device. In various implementations, the first device determines the location and/or orientation of the particular second device by reading machine-readable code displayed by the particular second device in the image of the physical environment.

In various implementations, determining the combined audio pick-up pattern includes combining (e.g., adding) the first audio pick-up pattern and the one or more second audio pick-up patterns.

The method 300 continues, in block 340, with the device displaying, on the display, a representation of the combined audio pick-up pattern. In various implementations, the first device determines one or more sets of coordinates in the coordinate system of the physical environment for the representation of the combined audio pick-up pattern at which the combined audio pick-up pattern is a threshold value. Thus, in various implementations, the representation of the combined audio pick-up pattern is a surface including locations in the physical environment at which the combined pick-up level is constant. In various implementations, displaying the representation of the combined audio pick-up pattern includes displaying the representation of the combined audio pick-up pattern in association with an image of the physical environment at a location in the physical environment (e.g., as a world-locked virtual object).

In various implementations, the method 300 includes detecting movement of at least one of the first device or the one or more second devices. The method 300 includes determining an updated combined audio pick-up pattern of the first device and the one or more second devices based on the movement. The method 300 includes displaying, on the display, a representation of the updated combined audio pick-up pattern.

In various implementations, the method 300 includes providing feedback regarding a target combined audio pick-up pattern. The target combined audio pick-up pattern may be based on the number and/or device types of the first device and/or one or more second devices. In various implementations, providing feedback regarding the target combined audio pick-up pattern includes providing haptic feedback at the first device in proportion to a distance from a location at which the target combined pick-up pattern is achieved. In various implementations, providing feedback regarding the target combined audio pick-up pattern includes displaying a representation of the target combined audio pick-up pattern.

As described above, in various implementations, the sound recorded by multiple microphones of multiple devices is combined to generate a combined sound. The combined sound can be used to determine a combined audio pick-up pattern of the multiple devices. Further, the combined sound can be used to determine an audio emission pattern of a sound source.

Figure 4:
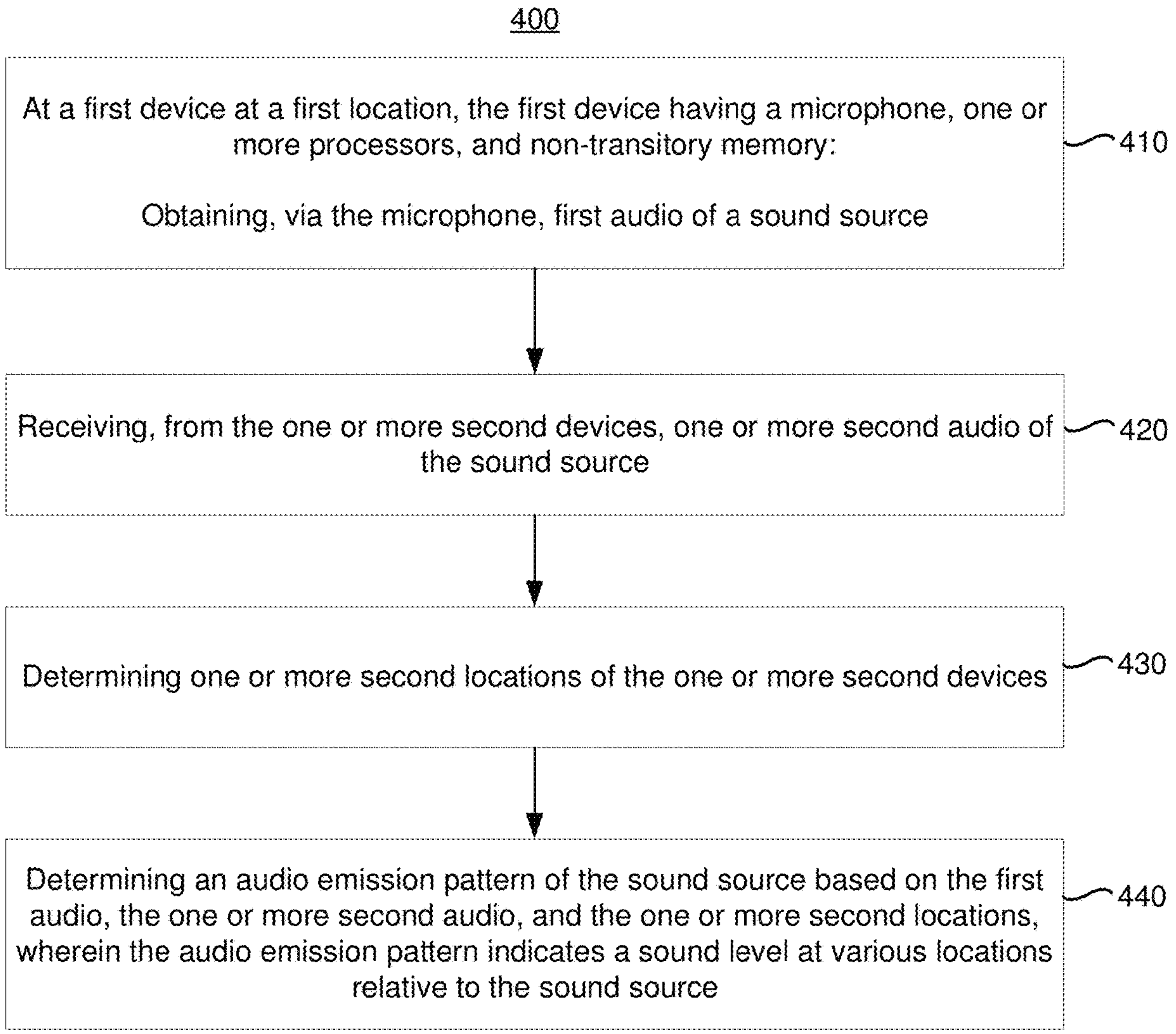
FIG. 4 is a flowchart representation of a method of determining an audio emission pattern in accordance with some implementations.

FIG. 4 is a flowchart representation of a method 400 of determining an audio emission pattern in accordance with some implementations. In various implementations, the method 400 is performed by a first device at a first location, the first device having a microphone, one or more processors, and non-transitory memory. In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the first device obtaining, via the microphone, first audio of a sound source.

The method 400 continues, in block 420, with the first device receiving, from one or more second devices, one or more second audio of the sound source.

The method 400 continues, in block 430, with the first device determining one or more second locations of the one or more second devices. In various implementations, the first device determines the location and/or orientation of a particular second device by detecting the particular second device in one or more images of a physical environment. In various implementations, the first device determines the location and/or orientation of a particular second device by receiving pose data from the particular second device. In various implementations, the first device determines the location and/or orientation of a particular second device by reading machine-readable code displayed by the particular second device in the image of the physical environment.

The method 400 continues, in block 440, with the first device determining an audio emission pattern of the sound source based on the first audio, the one or more second audio, and the one or more second locations, wherein the audio emission pattern of the sound source indicates a sound level at various locations relative to the sound source.

In various implementations, determining the audio emission pattern includes determining combined audio based on the first audio and the one or more second audio. In various implementations, determining the combined audio includes synchronizing the first audio and the one or more second audio. In various implementations, the first audio and the one or more second audio are synchronized using cross-correlations. In various implementations, determining the combined audio includes filtering direct audio from reverberation audio in at least one of the first audio and one or more second audio. In various implementations, the filtering includes zero-forcing or MMSE ("minimum mean squared-error") equalization. In various implementations, determining the combined audio includes performing noise reduction in at least one of the first audio and one or more second audio.

In various implementations, determining the audio emission pattern includes determining a base volume of the sound source at each of a plurality of times and each of a plurality of frequencies. In various implementations, the base value of the sound source at each of the plurality of times and each of the plurality of frequencies is determined based on the volume of the combined audio at the time and frequency.

In various implementations, determining the audio emission pattern includes, for the first audio (associated with the first device) and each of the one or more second audio (respectively associated with the one or more second devices), determining a directional volume of the sound source at each of the plurality of times and each of the plurality of frequencies. In various implementations, determining the directional volume of the sound source at each of the plurality of times and each of the plurality of frequencies is based on a volume of the audio at the time, a pose of the respective device, and an audio pick-up pattern of the respective device.

In various implementations, determining the audio emission pattern includes, for the first audio and each of the one or more second audio, determining a normalized directional volume of sound at each of the plurality of times and each of the plurality of frequencies by dividing the directional volume of sound at the time and frequency by the base volume of sound at the time and frequency.

In various implementations, the normalized directional volume of sound for the first audio and each of the one or more second audio at each of the plurality of times and each of the plurality of frequencies are combined to generate a time-varying, frequency-dependent audio emission pattern. Thus, in various implementations, the audio emission pattern of the sound source indicates, at a particular location relative to the sound source, a sound level at various frequencies. Further, in various implementations, the audio emission pattern of the sound source indicates, at a particular location relative to the sound source, a sound level at various times. In various implementations, the time-varying, frequency-dependent audio emission pattern is averaged over time and/or frequency.

In various implementations, determining the audio emission pattern includes interpolating the normalized directional volume of sound at two locations to determine the normalized directional volume of sound at a different location. Thus, in various implementations, determining the audio emission pattern of the sound source includes determining a sound level at a third location, different from the first location and the one or more second locations, based on at least two of a sound level at the first location and one or more sound levels at the one or more second locations.

In various implementations, the method 400 includes storing the audio emission pattern of the sound source in association with the combined audio. Thus, the audio emission pattern of the sound source can be used to render a virtual sound source playing the combined audio. In various implementations, the audio emission pattern of the sound source can be used to render a virtual sound source playing audio other than the combined audio.

Figure 5:
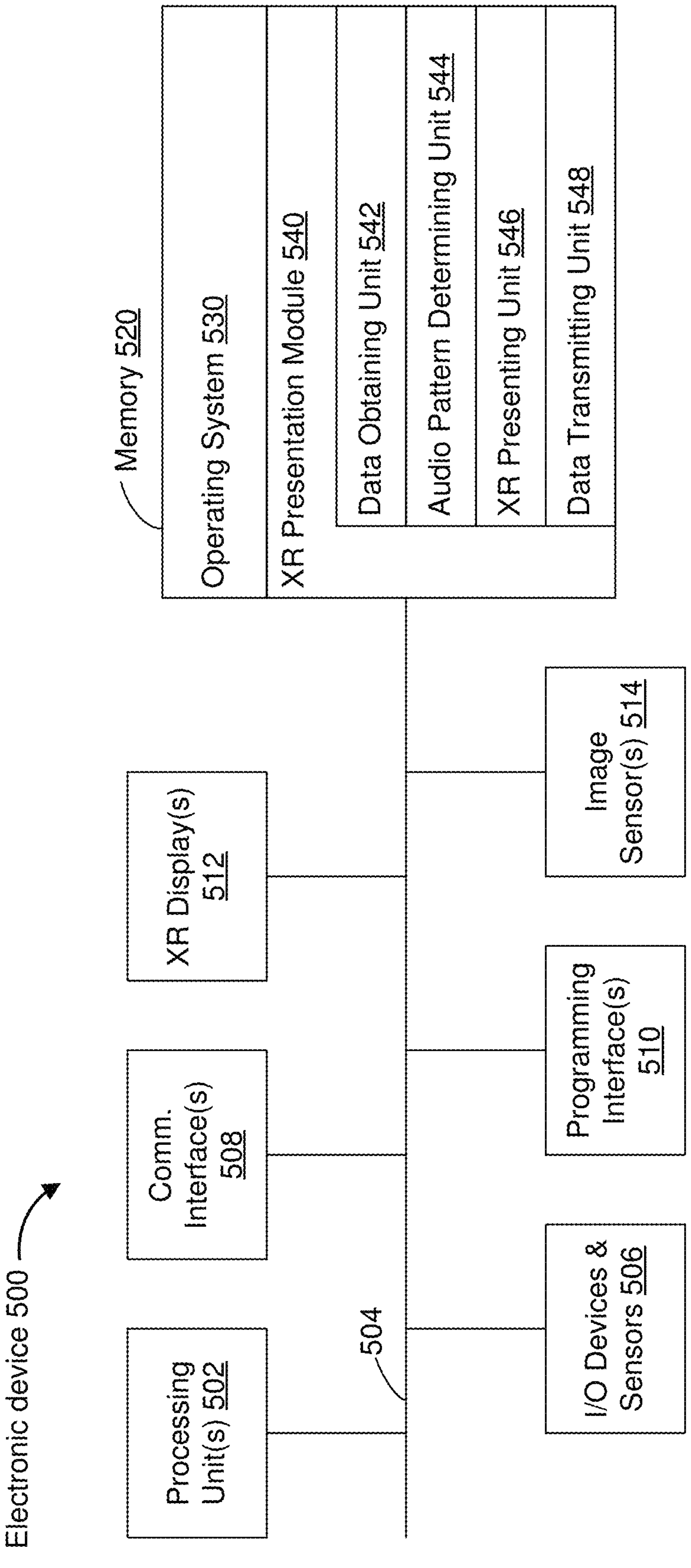
FIG. 5 is a block diagram of an electronic device in accordance with some implementations.

FIG. 5 is a block diagram of an electronic device 500 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 500 includes one or more processing units 502 (e.g., microprocessors, ASICs, FPGAs, GPUs, CPUs, processing cores, and/or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 510, one or more XR displays 512, one or more optional interior- and/or exterior-facing image sensors 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 512 are configured to present XR content to the user. In some implementations, the one or more XR displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 512 correspond to diffractive, reflective, polarized, holographic, etc. waveguide displays. For example, the electronic device 500 includes a single XR display. In another example, the electronic device 500 includes an XR display for each eye of the user. In some implementations, the one or more XR displays 412 are capable of presenting AR, MR, and/or VR content.

In various implementations, the one or more XR displays 512 are video passthrough displays which display at least a portion of a real scene as an image captured by a scene camera. In various implementations, the one or more XR displays 512 are optical see-through displays which are at least partially transparent and pass light emitted by or reflected off the real scene.

In some implementations, the one or more image sensors 514 are configured to obtain image data that corresponds to at least a portion of the face of the user that includes the eyes of the user (any may be referred to as an eye-tracking camera). In some implementations, the one or more image sensors 514 are configured to be forward-facing so as to obtain image data that corresponds to the physical environment as would be viewed by the user if the electronic device 500 was not present (and may be referred to as a scene camera). The one or more optional image sensors 514 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and an XR presentation module 540.

The operating system 530 includes procedures for handling various basic system services and for performing hardware dependent tasks. In some implementations, the XR presentation module 540 is configured to present XR content to the user via the one or more XR displays 512. To that end, in various implementations, the XR presentation module 540 includes a data obtaining unit 542, an audio pattern determining unit 544, an XR presenting unit 546, and a data transmitting unit 548.

In some implementations, the data obtaining unit 542 is configured to obtain data (e.g., presentation data, interaction data, sensor data, location data, etc.). The data may be obtained from the one or more processing units 502 or another electronic device. To that end, in various implementations, the data obtaining unit 542 includes instructions and/or logic therefor, and heuristics and metadata therefor.

In some implementations, the audio pattern determining unit 544 is configured to determine a combined audio pick-up pattern and/or an audio emission pattern of a sound source. To that end, in various implementations, the audio pattern determining unit 544 includes instructions and/or logic therefor, and heuristics and metadata therefor.

In some implementations, the XR presenting unit 546 is configured to present XR content via the one or more XR displays 512. To that end, in various implementations, the XR presenting unit 546 includes instructions and/or logic therefor, and heuristics and metadata therefor.

In some implementations, the data transmitting unit 548 is configured to transmit data (e.g., presentation data, location data, etc.) to the one or more processing units 502, the memory 520, or another electronic device. To that end, in various implementations, the data transmitting unit 548 includes instructions and/or logic therefor, and heuristics and metadata therefor.

Although the data obtaining unit 542, the audio pattern determining unit 544, the XR presenting unit 546, and the data transmitting unit 548 are shown as residing on a single electronic device 500, it should be understood that in other implementations, any combination of the data obtaining unit 542, the audio pattern determining unit 544, the XR presenting unit 546, and the data transmitting unit 548 may be located in separate computing devices.

Moreover, FIG. 5 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a first device at a first location, the first device having a microphone, one or more processors, and non-transitory memory;

obtaining, via the microphone, first audio of a sound source;

receiving, from one or more second devices, one or more second audio of the sound source;

determining one or more second locations of the one or more second devices; and determining an audio emission pattern of the sound source based on the first audio, the one or more second audio, and the one or more second locations, wherein the audio emission pattern of the sound source indicates a sound level at various locations relative to the sound source.

2. The method of claim 1, wherein determining the second location of a particular second device includes detecting the particular second device in one or more images of a physical environment.

3. The method of claim 2, wherein determining the second location of the particular second device includes identifying the particular second device based on data encoded in the one or more images of the physical environment.

4. The method of claim 1, wherein determining the audio emission pattern of the sound source includes generating combined audio based on the first audio and the one or more second audio.

5. The method of claim 4, wherein generating the combined audio includes synchronizing the first audio and the one or more second audio.

6. The method of claim 4, wherein generating the combined audio includes filtering direct audio from reverberation audio in at least one of the first audio and one or more second audio.

7. The method of claim 4, wherein generating the combined audio includes performing noise reduction in at least one of the first audio and one or more second audio.

8. The method of claim 4, wherein determining the audio emission pattern includes determining a base volume of the sound source at each of a plurality of times and each of a plurality of frequencies based on a volume of the combined audio at the time and frequency.

9. The method of claim 8, wherein determining the audio emission pattern includes, for the first audio associated with the first device and each of the one or more second audio respectively associated with the one or more second devices, determining a directional volume of the sound source at each of the plurality of times and each of the plurality of frequencies based on a volume of the audio at the time, a pose of the respective device, and an audio pick-up pattern of the respective device.

10. The method of claim 9, wherein determining the audio emission pattern includes, for the first audio and each of the one or more second audio, determining a normalized directional volume of sound at each of the plurality of times and each of the plurality of frequencies by dividing the directional volume of sound at the time and frequency by the base volume of sound at the time and frequency.

11. The method of claim 1, wherein the audio emission pattern of the sound source indicates, at a particular location relative to the sound source, a sound level at various frequencies.

12. The method of claim 1, wherein the audio emission pattern of the sound source indicates, at a particular location relative to the sound source, a sound level at various times.

13. The method of claim 1, wherein determining the audio emission pattern of the sound source includes determining a sound level at a third location, different from the first location and the one or more second locations, based on at least two of a sound level at the first location and one or more sound levels at the one or more second locations.

14. The method of claim 1, further comprising storing the audio emission pattern of the sound source in association with combined audio based on the first audio and the one or more second audio.

15. A device at a first location comprising:

a microphone;

non-transitory memory; and one or more processors to:

obtain, via the microphone, first audio of a sound source;

receive, from one or more second devices, one or more second audio of the sound source;

determine one or more second locations of the one or more second devices; and determine an audio emission pattern of the sound source based on the first audio, the one or more second audio, and the one or more second locations, wherein the audio emission pattern of the sound source indicates a sound level at various locations relative to the sound source.

16. The device of claim 15, wherein the one or more processors are to determine the audio emission pattern of the sound source by generating combined audio based on the first audio and the one or more second audio.

17. The device of claim 15, wherein the audio emission pattern of the sound source indicates, at a particular location relative to the sound source, a sound level at various times and frequencies.

18. The device of claim 15, wherein the one or more processors are to determine the audio emission pattern of the sound source by determining a sound level at a third location, different from the first location and the one or more second locations, based on at least two of a sound level at the first location and one or more sound levels at the one or more second locations.

19. The device of claim 15, wherein the one or more processors are further to store the audio emission pattern of the sound source in association with combined audio based on the first audio and the one or more second audio.

20. A non-transitory memory storing one or more programs, which, when executed by one or more processors of a device at a first location including a microphone, cause the device to:

obtain, via the microphone, first audio of a sound source;

receive, from one or more second devices, one or more second audio of the sound source;

determine one or more second locations of the one or more second devices; and determine an audio emission pattern of the sound source based on the first audio, the one or more second audio, and the one or more second locations, wherein the audio emission pattern of the sound source indicates a sound level at various locations relative to the sound source.

* * * * *